(12) United States Patent
He et al.

(10) Patent No.: US 8,582,639 B2
(45) Date of Patent: Nov. 12, 2013

(54) METHODS AND DEVICES FOR DATA COMPRESSION USING ADAPTIVE RECONSTRUCTION LEVELS

(75) Inventors: Dake He, Waterloo (CA); Xiang Yu, Kitchener (CA); En-Hui Yang, Waterloo (CA)

(73) Assignee: BlackBerry Limited, Waterloo, ON (CA)

( * ) Notice: Subject to any disclaimer, the term of this patent is extended or adjusted under 35 U.S.C. 154(b) by 535 days.

(21) Appl. No.: 12/830,548

(22) Filed: Jul. 6, 2010

(65) Prior Publication Data
US 2012/0008680 A1 Jan. 12, 2012

(51) Int. Cl.
*H04N 7/50* (2006.01)
*H04B 1/66* (2006.01)

(52) U.S. Cl.
USPC .......................................... 375/240; 375/245

(58) Field of Classification Search
USPC ...................... 375/240.03, 240.029
See application file for complete search history.

(56) References Cited

U.S. PATENT DOCUMENTS

| | | | |
|---|---|---|---|
| 7,580,584 B2 * | 8/2009 | Holcomb et al. | 382/239 |
| 7,936,818 B2 * | 5/2011 | Jayant et al. | 375/240.05 |
| 2006/0013497 A1 | 1/2006 | Yang et al. | |
| 2007/0217506 A1 | 9/2007 | Yang et al. | |
| 2007/0248163 A1 * | 10/2007 | Zuo et al. | 375/240.2 |
| 2010/0208805 A1 * | 8/2010 | Yu et al. | 375/240.12 |

OTHER PUBLICATIONS

ITU-T Recommendation H.264/ISO/IEC 14496-10 AVC, Advanced video coding for general audiovisual services, Nov. 2007.

T. Wiegand and G. J. Sullivan and A. Luthra, ITU-T Rec. H.264/ISO/IEC 14496-10 AVC, Joint Video Team of ISO/IEC MPEG and ITU-T VCEG.

E.-h. Yang and X. Yu, On joint optimization of motion compensation, quantization and baseline entropy coding in H.264 with complete decoder compatibility, Proceedings of IEEE International Conference on Acoustics, Speech, and Signal Processing, pp. II325-II328, Mar. 2005.

E.-h. Yang and X. Yu, Rate Distortion Optimization of H.264 with Main Profile Compatibility, IEEE International Symposium on Information Theory, pp. 282-286, Jul. 2006.

E.-h. Yang and X. Yu, Rate Distortion Optimization for H.264 Interframe Coding: A General Framework and Algorithms, IEEE Trans. on Image Processing, pp. 1774-1784, vol. 16, Jul. 2007.

S. Lloyd, "Least Squares Quantization in PCM", IEEE Trans. on Information Theory, vol. IT-28, No. 2, pp. 129-137, Mar. 1982.

H.S. Malvar, A. Hallapuro, M. Karczewicz, L. Kerofsky, "Low-complexity transform and quantization in H.264/AVC," IEEE Transactions on Circuits and Systems for Video Technology, vol. 13, Issue 7, pp. 598-603, Jul. 2003.

(Continued)

*Primary Examiner* — Sath V Perungavoor
*Assistant Examiner* — Howard D Brown, Jr.
(74) *Attorney, Agent, or Firm* — Rowand LLP (57) ABSTRACT

Encoding and decoding methods that perform quantization using adaptive reconstruction levels are presented. The reconstruction levels for a given partitioning of the data space may be selected based upon the distribution of data points within each sub-part defined by the partitioning. In some cases, the adaptive reconstruction levels may be based upon an average of the data points within each sub-part. In some cases, the adaptive reconstruction levels may be selected using a rate-distortion analysis including the quantization distortion associated with the levels versus the data points and the rate associated with transmitting the encoded adaptive reconstruction levels. The methods relate to data compression in a range of applications including audio, images and video.

26 Claims, 8 Drawing Sheets

(56) References Cited

OTHER PUBLICATIONS

A. Tanizawa, T. Chujoh, "Simulation results of Adaptive Quantization Matrix Selection on KTA software," ITU-SG16/Q6, Document VCEG-AC07, Klagenfurt, Austria, Jul. 17-18, 2006.

Xiang Yu et al: "Adaptive quantization with balanced distortion distribution and its application to H.264 intra coding" Image Processing (ICIP), 2009 16th IEEE International Conference on, IEEE, Piscataway, NJ, USA LNKD D0I:10.1109/ICIP.2009.5413738, Nov. 7, 2009, pp. 1049-1052, XP031628437.

En-Hui Yang et al: "Soft Decision Quantization for H.264 With Main Profile Compatibility" IEEE Transactions on Circuits and Systems for Video Technology, IEEE Service Center, Piscataway, NJ, US LNKD 001:10.1109/TCSVT.2008.2009260, vol. 19, No. 1, Jan. 1, 2009, pp. 122-127, XP011280553.

En-Hui Yang et al: "Rate Distortion Optimization for H.264 Interframe Coding: A General Framework and Algorithms" IEEE Transactions on Image Processing, IEEE Service Center, Piscataway, NJ, US LNKD-DOI:10.1109/TIP.2007.896685, vol. 16, No. 7, Jul. 1, 2007, pp. 1774-1784, XP011185448.

Matthew Crouse et al: "Joint Thresholding and Quantizer Selection for Transform Image Coding: Entropy-Constrained Analysis and Applications to Baseline JPEG" IEEE Transactions on Image Processing, IEEE Service Center, Piscataway, NJ, US, vol. 6, No. 2, Feb. 1, 1997, XP011026108.

Jiangtao Wen et al: "Trellis-Based R-D Optimal Quantization in H.263+" IEEE Transactions on Image Processing, IEEE Service Center, Piscataway, NJ, US, vol. 9, No. 8, Aug. 1, 2000, XP011025644.

Extended European Search Report dated Oct. 14, 2010.

Wang, Y., "EE3414 Multimedia Communication Systems-I Quantization", 2006. Retrieved from the Internet: <URL: http://eeweb.poly.edu/-yao/EE3414/quantization.pdf.>.

Wang, J., Yu, X., and He, D-k., "Hard-decision Quantization with Adaptive Reconstruction Levels for High Efficiency Video Coding", Information Theory (CWIT), 2011 12th Canadian Workshop, pp. 62-65, May 17, 2011.

International Search Report dated Oct. 12, 2011, PCT/CA2011/050401.

* cited by examiner

METHODS AND DEVICES FOR DATA COMPRESSION USING ADAPTIVE RECONSTRUCTION LEVELS

FIELD

The present application generally relates to data compression and, in particular, to methods and devices for using adaptive reconstruction levels in quantization and de-quantization.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU: High Efficiency Video Coding (HEVC).

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC will also have these features.

When spectrally transforming residual data, many of these standards prescribe the use of a discrete cosine transform (DCT) or some variant thereon. The resulting DCT coefficients are then quantized using a quantizer that employs a uniform quantization step size, i.e. a uniform partitioning of the data space.

Work in lossy compression, e.g., audio/voice coding, video coding, image coding, etc., tends to focus on improving rate-distortion performance. That is, the objective of most encoding and decoding schemes is to find an optimal balance between distortion and coding rate. A rate-distortion optimization expression of the type $J=D+\lambda R$ is typically used, wherein the Lagrangian multiplier $\lambda$ represents the desired trade-off between coding rate and distortion.

It would be advantageous to provide for an improved encoder, decoder and method of encoding or decoding.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present application describes methods and encoders/decoders for achieving rate-distortion improvements in lossy data compression. In some embodiments, the data compression process or devices described herein may be applied to the encoding and decoding of audio data, image data, and/or video data. In particular, the present application describes a method and process of data compression that uses adaptive reconstruction levels within a quantization operation.

In one aspect, the present application describes method for encoding of a sequence of data points within a data space using a lossy data compression process. The method includes assigning a quantization index u to each data point based on a partitioning of the data space into sub-parts, wherein each sub-part is associated with one of the quantization indices u; for at least some of the sub-parts, calculating an adaptive reconstruction level $q_u$ that minimizes the joint cost of total distortion from quantization of the data points within that sub-part and the rate of transmitting the adaptive reconstruction level $q_u$; and encoding the adaptive reconstruction levels $q_u$ and encoding the data points by their respective assigned quantization indices u, to produce encoded data.

In another aspect, the present application describes method of decoding encoded compressed data, wherein the compressed data results from a lossy data compression process. The method includes entropy decoding the encoded compressed data to obtain indices u and adaptive reconstruction levels $q_u$, wherein each index u obtained is a quantized data point from the lossy data compression process, and wherein the indices a are each associated with a respective sub-part of a data space, and wherein each adaptive reconstruction level $q_u$ specifies a reconstruction level for one of the sub-parts; and reconstructing data points as the product of each index u obtained and the adaptive reconstruction level q, associated with that index, to produce a sequence of decoded data.

In a further aspect, the present application describes encoders and decoders configured to implement such methods of encoding and decoding.

In yet a further aspect, the present application describes computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding. Those ordinarily skilled in the art will understand that the present application is not limited to H.264 but may be applicable to other video coding/decoding standards, including possible future standards, such as HEVC. It will also be appreciated that the present application is not necessarily limited to video coding/decoding and may be applicable to audio coding/decoding, image coding/decoding, or the lossy coding/decoding of any other data. The present application is broadly applicable to any lossy data compression process that employs quantization irrespective of the type of data being coded/decoded.

In the description that follows, when referring to video or images the terms frame and slice may be used somewhat interchangeably. Those of skill in the art will appreciate that, in the case of the H.264 standard, a frame may contain one or more slices. It will also be appreciated that certain encoding/decoding operations are performed on a frame-by-frame basis and some are performed on a slice-by-slice basis, depending on the particular requirements of the applicable image or video coding standard. In any particular embodiment, the applicable image or video coding standard may determine whether the operations described below are performed in connection with frames and/or slices, as the case may be. Accordingly, those ordinarily skilled in the art will understand, in light of the present disclosure, whether particular operations or processes described herein and particular references to frames, slices, or both are applicable to frames, slices, or both for a given embodiment.

In the discussion that follows, reference is made to DCT coefficients and the DCT domain; however, it will be appreciated that this application is not limited the encoding of DCT coefficients, the encoding of block-based transform coefficients, the encoding of block-based data, or any particular data type. To the extent that the processes or methods described below are applied to images and/or video they may be applied on a block-basis, a slice-basis, a frame-basis, a Group-of-Pictures (GOP) basis, or otherwise, as will be appreciated by those ordinarily skilled in the art after a full review of the following description. To the extent that the process or methods described herein are applied to audio, such as music or voice data, they may be applied to a grouping or sequence of data points, e.g. an audio sample.

Figure 1:
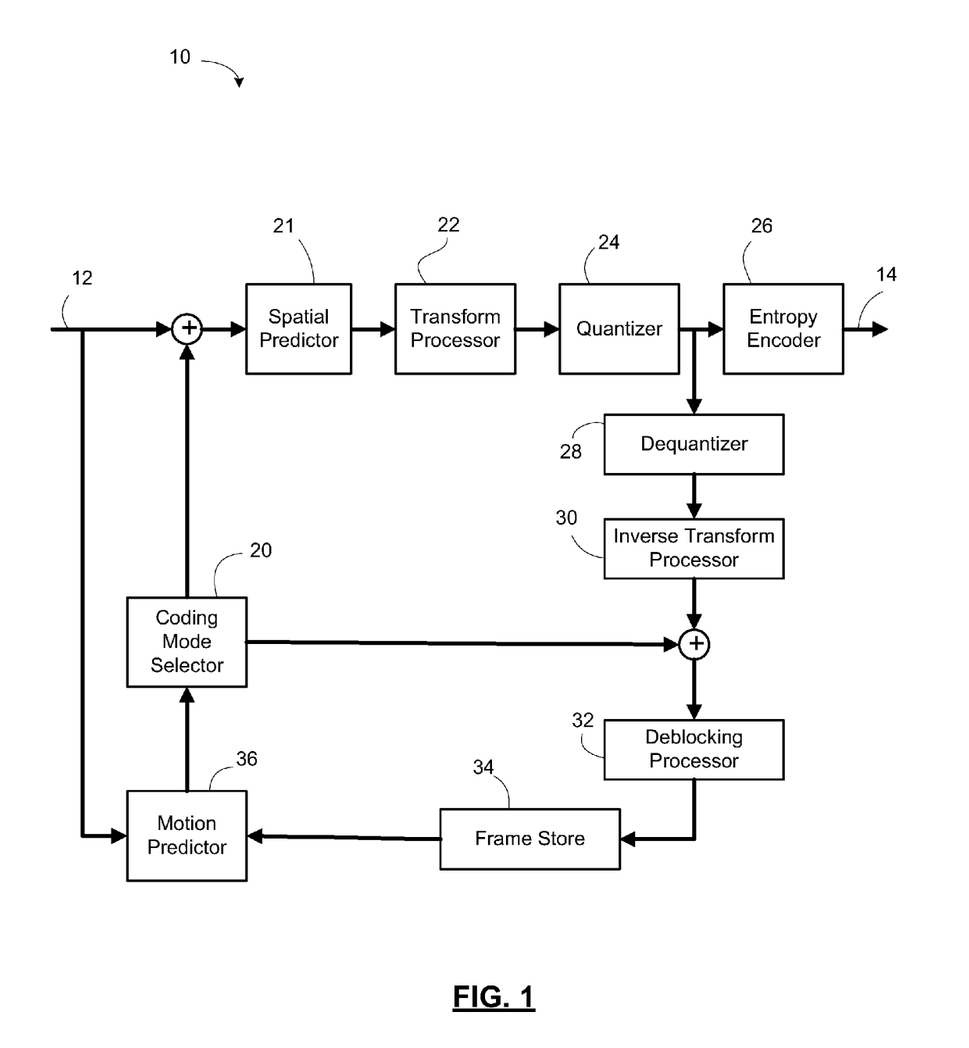
FIG. 1 shows, in block diagram form, an encoder for encoding video.
Figure 2:
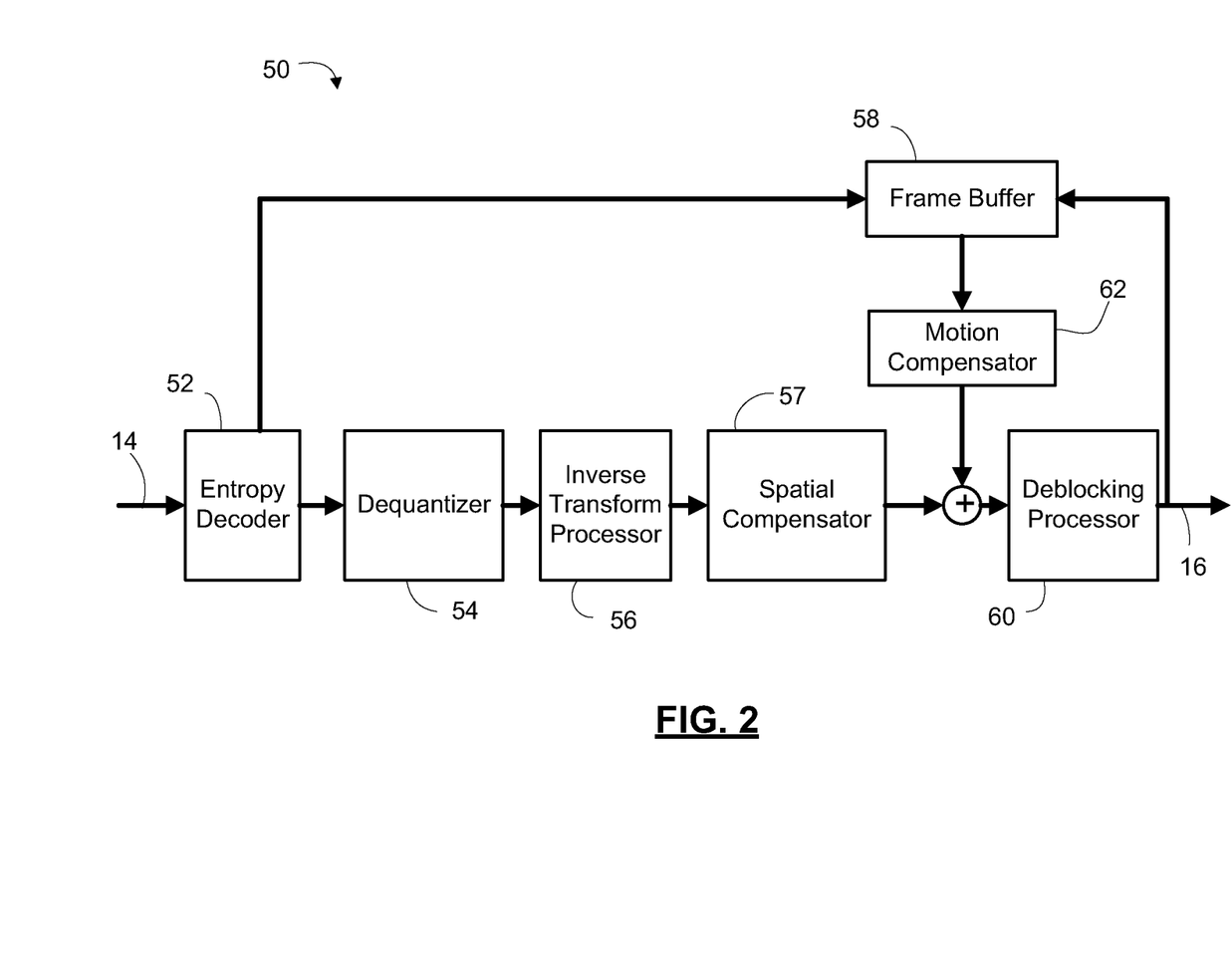
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular macroblocks within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a macroblock or sub-block basis, depending on the size of the macroblocks. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing H.264 encoders.

The decoder 50 includes an entropy decoder 52, dequantizer 54, inverse transform processor 56, spatial compensator 57, and deblocking processor 60. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock, the recreated "video data" is the residual data for use in spatial compensation relative to a previously decoded block within the frame. The spatial compensator 57 generates the video data from the residual data and pixel data from a previously decoded block. In other cases, such as inter-coded macroblocks, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock. It does so based on the reference frame information and motion vector specified for the inter-coded macroblock. It then supplies the reference block pixel data for combination with the residual data to arrive at the recreated video data for that macroblock.

A deblocking process may then be applied to a reconstructed frame/slice, as indicated by the deblocking processor 60. After deblocking, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC-compliant encoders and decoders will have many of these same features.

Quantization

For a given block of pixels x with a prediction p, the residual is $z=x-p$. In this example, the block of pixels x and residual z are the same size as the transform matrix t. The residual z is transformed (for example by using a DCT) to generate the set of transform domain coefficients c. The coefficients c are quantized using a selected quantization step size to produce a set of quantized coefficients u. This may be expressed as:

$$u = \text{round}(c/q + \delta) \quad (1)$$

where an input c is quantized to a by applying a quantization step size q, and $1 > \delta > 0$ is an offset. Because the quantization output is calculated by a deterministic function, this is also called hard-decision quantization.

The quantization operation can be viewed from a rate-distortion point-of-view. In fact, the quantization operation can be refined so as to select indices u such that the selected indices result in a minimum rate-distortion cost. The minimum rate-distortion cost may be expressed as follows:

$$\min_u |c - u \cdot q|^2 + \lambda \cdot r(u) \quad (2)$$

In Equation (2), c is the matrix of transform coefficients, q is the quantization step size, and u is the corresponding matrix of indices to which the coefficients have been quantized. The symbol • stands for element-wise multiplication between matrixes. $\lambda$ is the Lagrangian multiplier, a constant that is determined by end users based on their preference of the coding rate and the video quality. A relatively small $\lambda$ puts more preference on better quality, while a larger $\lambda$ emphasizes on a lower coding rate. r(u) represents the rate function by entropy coding for the indices u, and r(u) represents the rate function for encoding and transmitting u. The entropy coding may be any suitable or applicable entropy coding scheme. In the case of JPEG images, for example, the coding may be Huffman coding. In the case of H.264 video, the coding may be CAVLC or CABAC coding. Yet other context-dependent or context-independent coding schemes may be applicable in particular embodiments. Clearly, the quantization output from Equation (2) is not given by a deterministic function anymore, but is the output of an optimization process that relates to both the rate and the distortion. Thus, it is named soft-decision quantization.

Example embodiments of soft-decision quantization are described in US patent publication no. 2007/0217506 filed by Yang et al. (hereinafter "Yang"). The Yang publication describes the optimization of a given a fixed q. This is termed "soft-decision quantization", since the transform domain coefficients themselves are treated as free-parameters in the rate-distortion optimization. The application of soft-decision quantization to H.264 encoding using CAVLC is described in Yang, and it may include the use of a trellis to search for a set of quantized coefficients u that result in a minimum cumulative rate-distortion for a given entropy encoding scheme. In the example described in Yang, the H.264 CAVLC encoding scheme was used for illustration.

In H.264 and in many other coding schemes the quantization step sizes are predetermined, and in a particular instance the encoder selects one of the quantization step sizes to use for quantizing a particular set of data points, whether a block, slice, frame, etc. The encoder then only needs to transmit an index or indicator so as to inform the decoder which quantization step size was used.

Figure 3:
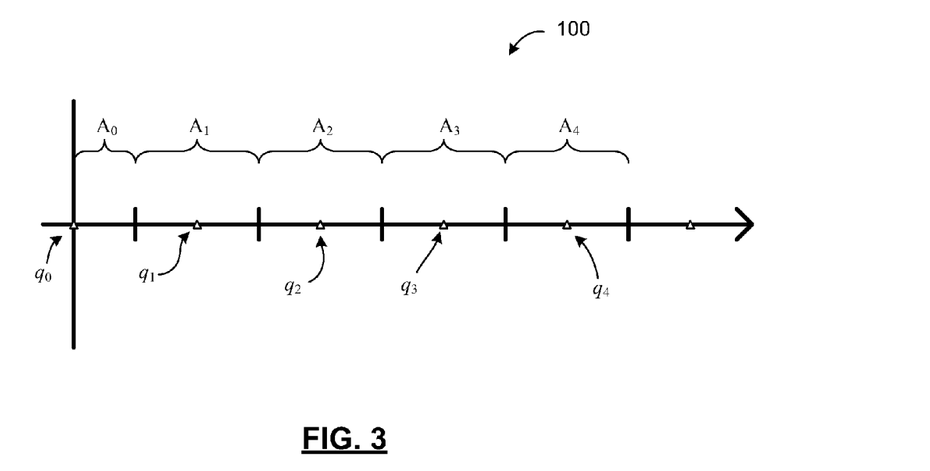
FIG. 3 shows an example of a partitioned data space.

Reference is now made to FIG. 3, which graphically illustrates a portion of a data space 100. In this example, the data space 100 contains the set of data points to be quantized using a selected quantization scheme. Conceptually, in order to perform quantization, the data space 100 may be considered to be partitioned into sub-parts $A_0, A_1, \ldots A_N$, where N+1 is the number of sub-parts. Each sub-part may be referenced by its index u, where u=0, 1, . . . , N. A data point falling within one of the sub-parts $A_i$ is quantized to index u=i. Reconstruction levels $q_u$ are at the midpoint of their respective sub-parts. When the decoder reconstructs a data point, it reconstructs it as reconstruction level $q_u$; in the case of u=i the data point is reconstructed as $q_i$ irrespective of where within the sub-part $A_i$ the actual data point was located. If the source data is uniform, then the assumption of a midpoint reconstruction level will result in minimal distortion; however the assumption of a uniform distribution of source data may be inaccurate in many cases.

Figure 4:
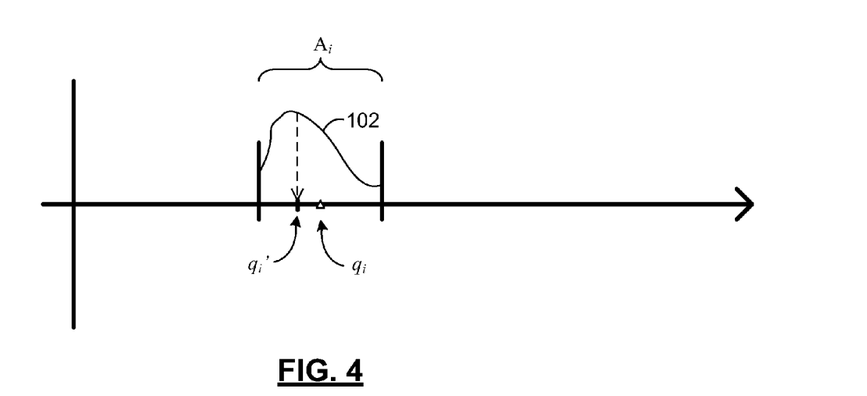
FIG. 4 shows an example of data point distribution within a sub-part of the partitioned data space.

Reference is now made to FIG. 4, which shows an example sub-part $A_i$. The midpoint reconstruction level is shown as $q_i$. The non-uniform distribution of the source data points is shown as reference numeral 102. It will be appreciated that data points with a distribution as shown by 102 would be better represented by an adaptive reconstruction level at or near $q_i'$. The adaptive reconstruction level may be based upon the actual distribution of data points that are associated with or assigned the index i, i.e. that are located within the sub-part $A_i$. The adaptive reconstruction level may be based upon the arithmetic mean or median or mode, in some embodiments. By adjusting the reconstruction level to reflect the distribution of the actual data points within a sub-part $A_i$, the presently described process compensates for some of the distortion attributable to the non-uniform distribution of the data points when relying upon an assumption of uniformity.

In many data compression processes, when quantization is performed the partitioning of the data space and selection of the reconstruction levels are not considered separately. For example, in ITU-T H.264/AVC, both are subsumed under the selection of a quantization step size. The present applicants have recognized that the partitioning of the data space and the selection of a reconstruction level for each sub-part may be considered separately, and need not be based upon a predetermined reconstruction level, for example at the midpoint of the sub-part as in ITU-T H.264/AVC.

Thus, the quantization under this process becomes a two-stage operation. First, the data points are assigned to a quantization index (i.e. based on the partitioning of the data space, the data points are grouped into sub-parts). The partitioning/quantization at this first stage may be uniform, non-uniform, predetermined hard-decision quantization, or soft-decision quantization. The step size/partition size may be selected from amongst a preset number of candidate step sizes/partition sizes based on a rate-distortion optimization process. In all these possible variations, the data points are each assigned one of the indices for the selected quantization partition structure.

Second, the adaptive reconstruction level for each sub-part of the partitioned data space (e.g. each index) is determined. The adaptive reconstruction level may be based upon an averaging of actual data points falling within the sub-part. The averaging may occur over a block, group of blocks, slice, frame, group-of-pictures (GOP) or other suitable collection of data points given the specific application.

The selection of the adaptive reconstruction level for each index may be based upon a rate-distortion analysis. In other words, it may be based upon selecting a reconstruction level that minimizes the total distortion given the actual data points within the sub-part. It may further be based upon minimizing a cost function including distortion from the difference between the reconstruction level and the actual data points and the rate cost associated with transmitting the reconstruction level. The rate cost associated with transmitting the reconstruction level may be based upon the encoding scheme used to entropy encode the reconstruction levels.

Figure 5:
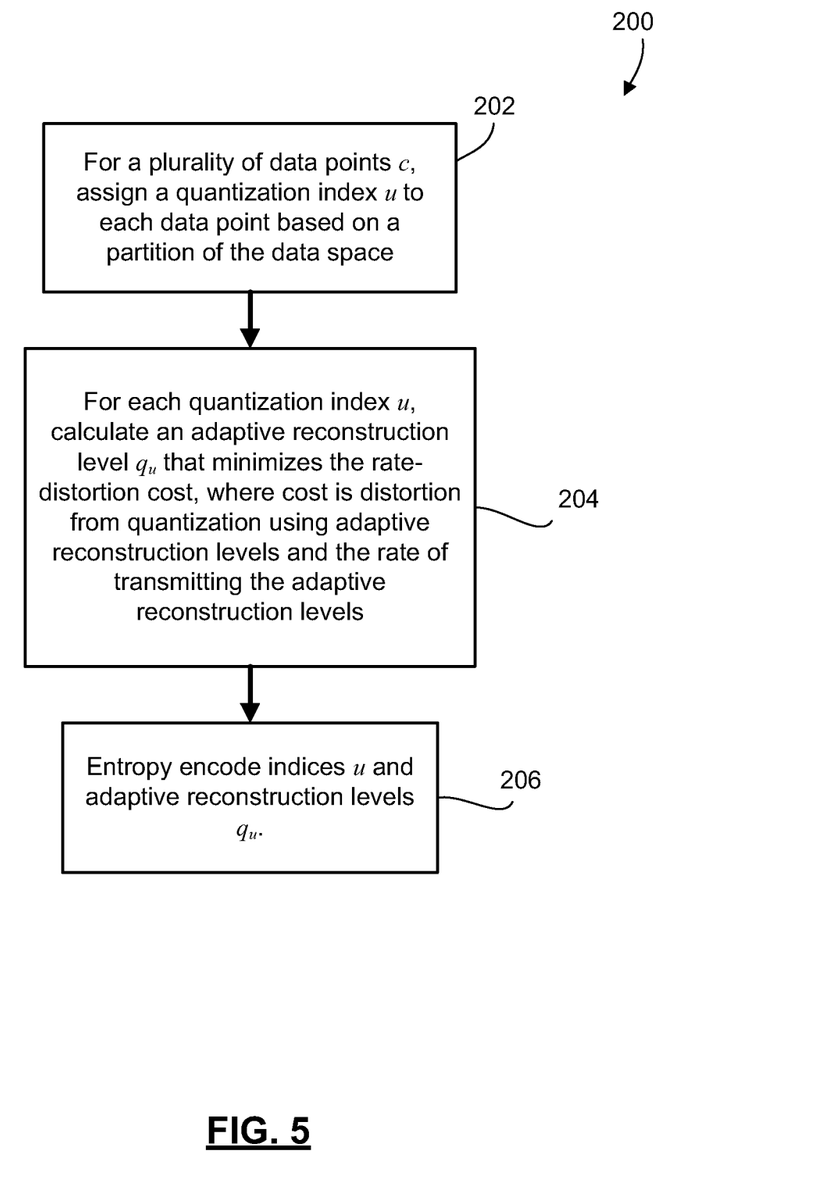
FIG. 5 shows, in flowchart form, an example method for encoding data points using quantization with adaptive reconstruction levels.

Reference is now made to FIG. 5, which shows, in flowchart form, a method 200 of quantizing data. The method 200 is for quantizing and encoding a plurality data points. The data points fall within a data space that may be considered to be partitioned into a set of sub-parts for the purpose of the quantization. Each of the sub-parts has an associated quantization index.

In operation 202, a quantization index is assigned to each of the data points. In other words, each data point falling within a sub-part is assigned the quantization index of that sub-part. The quantization that occurs in operation 202 may be hard-decision quantization or soft-decision quantization. The partitioning of the data space may be uniform or non-uniform.

Once the data points have been quantized in operation 202, i.e. have each been assigned a quantization index, then in operation 204 an adaptive reconstruction level is calculated for each quantization index. The adaptive reconstruction level of a given index is calculated based on minimizing the joint cost of the total distortion from quantizing the data points within that sub-part and the rate of transmitting the adaptive reconstruction level. A Lagrangian rate-distortion cost expression may be used to determine the minimum cost and select the corresponding adaptive reconstruction level.

Once the adaptive reconstruction level for each index has been calculated in operation 204, then in operation 206 the adaptive reconstruction levels and the data points are entropy encoded. It will be understood that the data points themselves are not encoded, but rather the quantization indices that have been assigned to them by the quantization of operation 202. Any suitable entropy encoding process or scheme may be used to encode the reconstruction levels. Selection of a suitable entropy encoding method, including selection of no encoding, is within the skill of an ordinary person familiar with the art.

In one example embodiment, given the quantization indices $u^n$ for a group of blocks $c^n$, the adaptive reconstruction levels are calculated to minimize a joint cost of the total distortion and the extra rate for transmitting the reconstruction levels. For each quantization index u, let $c_{u,1}, c_{u,2}, \ldots, c_{u,m}$ denote the input source symbols (for example, DCT coefficients in H.264 before quantization) which are quantized to u, where m is an integer depending upon u. Then we find $q_u$ such that $q_u$ minimizes $$(c_{u,1} - u \cdot q_u)^2 + (c_{u,2} - u \cdot q_u)^2 + \ldots + (c_{u,m} - u \cdot q_u)^2 + \lambda \cdot r(q_u) \qquad (3)$$

where $r(q_u)$ denotes the length function of a prefix code for $q_u$ according to the selected entropy encoding scheme.

Figure 6:
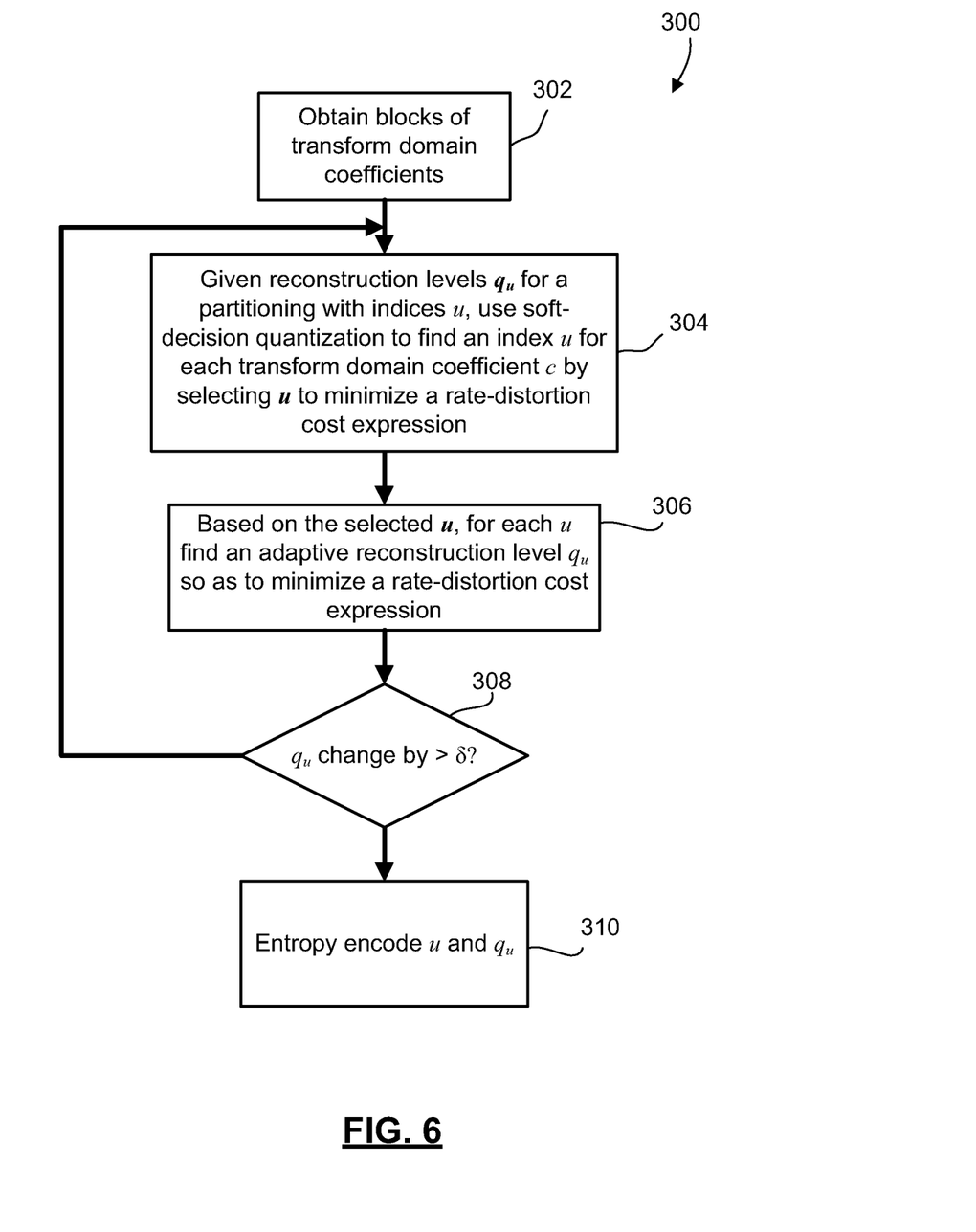
FIG. 6 shows, in flowchart form, an example method for encoding video data using soft-decision quantization with adaptive reconstruction levels.

Reference is now made to FIG. 6, which shows, in flowchart form, an example method 300 of encoding video data. This example method 300 illustrates the specific application of the quantization process described above in the context of video encoding. The method 300 may be implemented in a video encoder using hardware, software, or a combination thereof.

In operation 302 blocks of transform domain coefficients c are obtained. It will be appreciated that there are many preceding steps, including performing motion or spatial prediction and obtaining residual values, with or without rate-distortion optimization. The transform domain coefficients c are obtained through spectral transform of the residual data, in some instances using a DCT operation. In many instances, the transform is performed on a block-by-block basis. The H.264 standard, for example, prescribes a DCT operation performed on 4×4 or 8×8 blocks of residual data. The resulting set of transform domain coefficients c include 16 or 64 data points, as the case may be. It will be appreciated that some of the operations described herein may also be performed on a block-by-block basis. However, in many cases the method 300 of determining adaptive reconstruction levels may be performed for groups of blocks at a time, such as a slice, frame, GOP, or other grouping of blocks of data.

In operation 304, given a set of reconstruction levels $q_u$ for a partitioning with indices u, soft decision quantization is performed to quantize the transform domain coefficients c, i.e. to assign an index u for each transform domain coefficient c. The soft decision quantization may include selecting indices a that minimize a total rate-distortion cost. Equation (2) above is an example expression that may be used to find indices resulting in a minimum total rate-distortion cost. The initial set of reconstruction levels $q_u$ may be those reconstruction levels associated with the current quantization step size, as prescribed by the applicable encoding standard.

Out of operation 304, the transform domain coefficients c are each quantized and represented by an assigned index u. In operation 306, those assigned indices u are fixed and adaptive reconstruction levels $q_u$ are found that minimize a rate-distortion cost, such as that given by Equation (3) above. After operation 306, each index a has an updated reconstruction level (referred to herein as an adaptive reconstruction level) $q_u$.

The process may be iterative. That is, operations 304 and 306 may be repeated by fixing the reconstruction levels in operation 304 to find indices that minimize the cost expression of Equation (2) and then fixing the indices in operation 306 to find the reconstruction levels that minimize the cost expression of Equation (3), repeatedly. Operation 308 may include an evaluation of whether to stop the iterative loop of operations 304 and 306. In this example operation 308 determines whether the adaptive reconstruction levels $q_u$ have changed by more than a threshold amount δ. If so, then operations 304 and 306 are repeated. If not, then the method 300 moves to operation 310, where the video is entropy encoded. This operation 310 includes entropy encoding the indices u and the adaptive reconstruction levels $q_u$.

Figure 7:
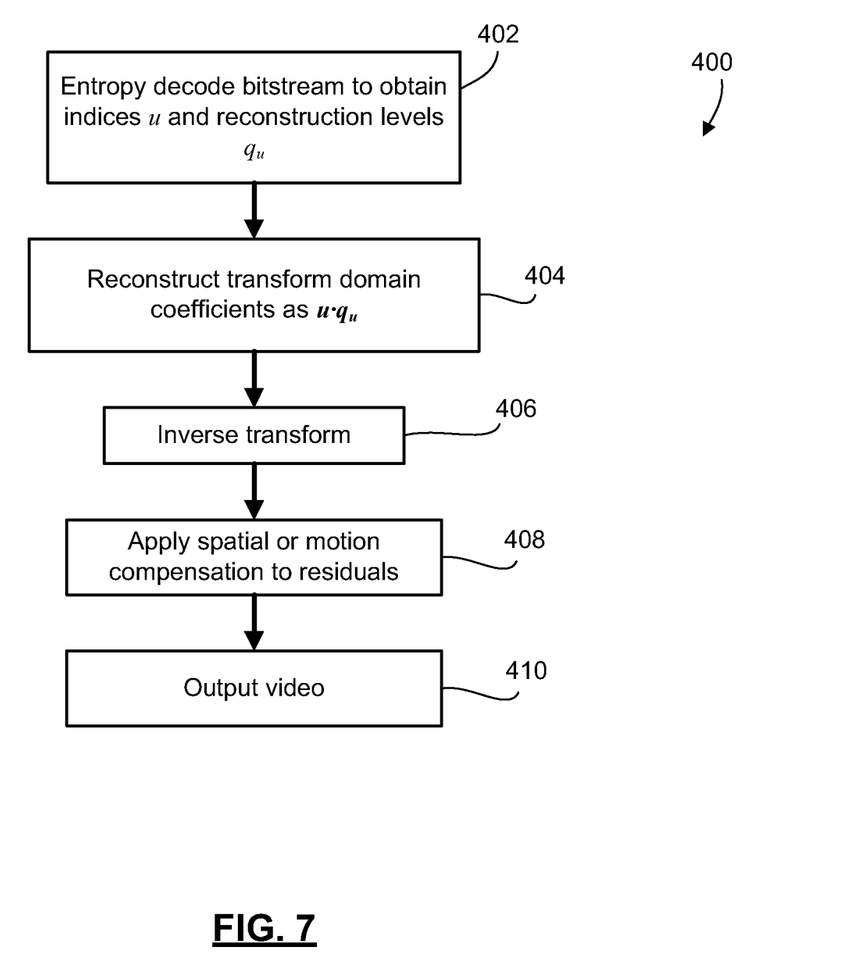
FIG. 7 shows, in flowchart form, an example method of decoding video data that has been encoded using quantization with adaptive reconstruction levels.

Decoding of an encoded video is now illustrated by way of the example method 400 shown in FIG. 7. The example method 400 is preceded by obtaining or receiving the encoded video data, for example over a computer network, a broadcast network, or from a digital recording device such as a DVD or other computer-readable medium. In operation 402 the bitstream of encoded video data is entropy decoded to obtain the indices u and the adaptive reconstruction levels $q_u$. In operation 404, the transform domain coefficients are reconstructed as $u \cdot q_u$. The reconstructed transform domain coefficients are then inverse transformed in operation 406, and suitable spatial or motion compensation is applied, as the case may be, in operation 408. In operation 410 the video is output, for example to a display screen or through a video output port.

It will be appreciated that in some embodiments, an adaptive reconstruction level $q_u$ may not be encoded and transmitted for every sub-part. Some sub-parts may have too few data points to justify sending an adaptive reconstruction level $q_u$ from a rate-distortion point of view. In other cases, some sub-parts may have a data point distribution with a median that does not deviate significantly from the midpoint of the sub-part, meaning that the adaptive reconstruction level $q_u$ is nearly identical to the midpoint and the distortion gain does not outweigh the rate cost associated with sending the adaptive reconstruction level $q_u$.

In one embodiment, the encoder and decoder may be configured such that the encoder calculates and transmits adaptive reconstruction levels $q_u$ for lower indices. As soon as the encoder encounters an index in which the adaptive reconstruction level $q_u$ should not be sent, due to a rate-distortion analysis, then the encoder ceases to calculate adaptive reconstruction levels for higher indices and inserts a stop code in the encoding of the adaptive reconstruction levels $q_u$ to indicate to the decoder that no further levels will be sent for higher indices. Other methods or operations for determining which adaptive reconstruction levels to send may be used.

In a case study of residual coding for video compression, a simple scheme of signaling adaptive reconstruction levels for only a few selected sub-parts as the corresponding average of data points within those sub-parts has proved to improve the rate distortion performance significantly.

In one possible embodiment, a finite set of quantizers with various reconstruction levels may be constructed or preconfigured. In the encoding process, the encoder may dynamically select one quantizer from the set of quantizers on the basis that it realizes the best rate-distortion performance, i.e. lowest cost, among the candidate quantizers of the set. The choice of quantizer is then communicated to the decoder in the output bitstream.

Figure 8:
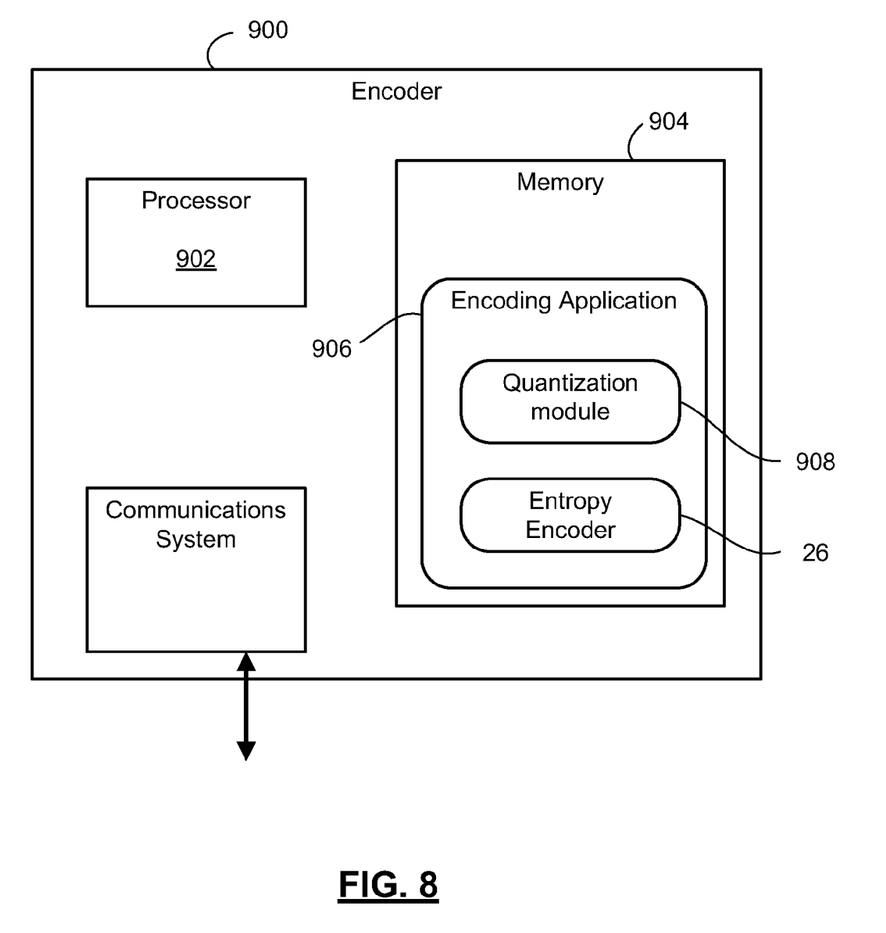
FIG. 8 shows a simplified block diagram of an example embodiment of an encoder.

Reference is now made to FIG. 8, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform steps or operations such as those described herein. For example, the encoding application 906 may encode and output bitstreams encoded in accordance with the adaptive reconstruction level quantization process described herein. The input data points may relate to audio, images, video, or other data that may be subject of a lossy data compression scheme. The encoding application 906 may include a quantization module 908 configured to determine an adaptive reconstruction level for each index of a partition structure. The encoding application 906 may include an entropy encoder 26 configured to entropy encode the adaptive reconstruction levels $q_u$ and other data. It will be understood that the encoding application 906 may be stored in on a computer readable medium, such as a compact disc, flash memory device, random access memory, hard drive, etc.

Figure 9:
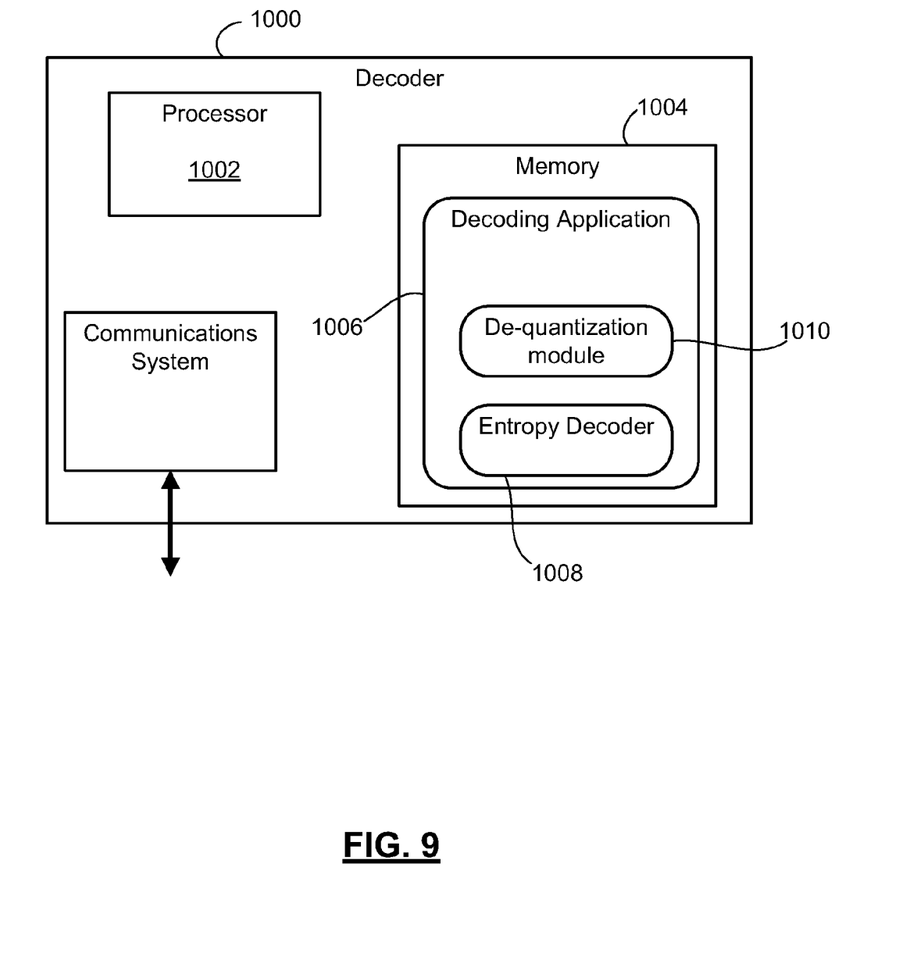
FIG. 9 shows a simplified block diagram of an example embodiment of a decoder.

Reference is now also made to FIG. 9, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform steps or operations such as those described herein. The decoding application 1006 may include an entropy decoder 1008 and a de-quantization module 1010 configured to obtain adaptive reconstruction levels $q_u$ and use them to reconstruct transform domain coefficients or other such data points. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method for encoding of a sequence of data points using a lossy data compression process implemented by a processor, the method comprising:
assigning, with the processor, a quantization index u to each data point based on quantizing that data point using a quantizer for each quantization index u of at least some of the quantization indices, calculating, with the processor, an adaptive reconstruction level $q_u$ for that quantization index u that minimizes the joint cost of total distortion from quantization of the data points to that quantization index u and the rate of transmitting the adaptive reconstruction level $q_u$, wherein the adaptive reconstruction level is based upon the actual data points quantized to that quantization index u;
encoding, using the processor, the adaptive reconstruction levels $q_u$; and
encoding, using the processor, for each data point, its respective assigned quantization index u,
wherein the sequence of data points comprise one of audio data, image data, and video data.

2. The method claimed in claim 1, wherein quantizing each data point comprises quantizing that data point using a quantization step size specified by the quantizer.

3. The method claimed in claim 1, wherein assigning a quantization index u to each data point comprises performing soft-decision quantization based on minimizing a rate-distortion cost expression given a fixed set of reconstruction levels.

4. The method claimed in claim 3, wherein minimizing the rate-distortion cost expression comprises calculating:

$$\min_u |c - u \cdot q|^2 + \lambda \cdot r(u)$$

wherein u are the indices, c are the data points, q is the quantization step size, and r(u) is
the rate associated with transmitting the encoded indices.

5. The method claimed in claim 3, wherein the fixed set of reconstruction levels comprise the respective products of each quantization index u and a quantization step size.

6. The method claimed in claim 3, wherein the assigning and calculating operations are repeated, and wherein the adaptive reconstruction levels are used in place of the fixed set of reconstruction levels when repeating the assigning, and wherein the repeating occurs until a change in adaptive reconstruction level is less than a threshold amount.

7. The method claimed in claim 1, wherein calculating the adaptive reconstruction levels is based upon minimizing the rate-distortion cost expression:

$$(c_{u,1} - u \cdot q_u)^2 + (c_{u,2} - u \cdot q_u)^2 + \ldots + (c_{u,m} - u \cdot q_u)^2 + \lambda \cdot r(q_u)$$

wherein c are the data points, u are the indices assigned, r( ) is a rate function based on an entropy encoding scheme for the adaptive reconstruction levels $q_u$, and m is an integer representing the number of data points assigned index u.

8. The method claimed in claim 1, wherein the data points comprise transform domain coefficients, and wherein the method further comprises obtaining the transform domain coefficients by determining residual data in a prediction operation and transforming the residual data in a video encoding process.

9. The method claimed in claim 1, wherein the data points comprise video data, and the sequence of data points comprise one of a slice, a frame, and a group-of-pictures.

10. A method of decoding encoded compressed data using a processor, wherein the compressed data results from a lossy data compression process, the method comprising:
entropy decoding, using the processor, the encoded compressed data to obtain indices u and adaptive reconstruction levels $q_u$, wherein each index u obtained is a quantized data point from the lossy data compression process, and wherein each adaptive reconstruction level $q_u$ specifies a reconstruction level for dequantizing one of the indices u and is based upon the actual data points quantized to that index u; and
reconstructing, using the processor, each data point as the product of a respective index u obtained and the adaptive reconstruction level $q_u$ associated with that index, to produce a sequence of decoded data,
wherein the sequence of decoded data comprises one of audio data, image data, and video data.

11. The method claimed in claim 10, wherein the compressed data comprises compressed video data, wherein the lossy data compression process comprises a video encoding process, and wherein the method further comprises inverse transforming the reconstructed sequence of decoded data to produce residual data, and performing a compensation operation on the residual data to produce reconstructed video data.

12. The method claimed in claim 10, wherein the encoded compressed data includes a set of the adaptive reconstruction levels $q_u$ for use in reconstructing the sequence of decoded data, and wherein the sequence of decoded data represents a reconstruction of an input data sequence.

13. An encoder for encoding a sequence of data points using a lossy data compression process, the encoder comprising:
a processor;
a memory storing the data points; and
an encoding application stored in memory and containing instructions for configuring the processor to encode the data points by
assigning a quantization index u to each data point based on quantizing that data point using a quantizer for each quantization index u of at least some of the quantization indices, calculating an adaptive reconstruction level $q_u$ for that quantization index u that minimizes the joint cost of total distortion from quantization of the data points to that quantization index u and the rate of transmitting the adaptive reconstruction level $q_u$, wherein the adaptive reconstruction level is based upon the actual data points quantized to that quantization index u;
encoding the adaptive reconstruction levels $q_u$; and
encoding, for each data point, its respective assigned quantization index u.

14. The encoder claimed in claim 13, wherein quantizing each data point comprises quantizing that data point using the a quantization step size specified by the quantizer.

15. The encoder claimed in claim 13, wherein the encoding application contains instructions for configuring the processor to assign the quantization indices u based on minimizing a rate-distortion cost expression given a fixed set of reconstruction levels.

16. The encoder claimed in claim 15, wherein the encoding application contains instructions for configuring the processor to minimize the rate-distortion cost expression by calculating:

$$\min_{u} |c - u \cdot q|^2 + \lambda \cdot r(u)$$

wherein u are the indices, c are the data points, q is the quantization step size, and r(u) is the rate associated with transmitting the encoded indices.

17. The encoder claimed in claim 15, wherein the fixed set of reconstruction levels comprise the respective products of each quantization index u and a quantization step size.

18. The encoder claimed in claim 15, wherein instructions configure the processor to perform the assigning and calculating operations repeatedly, and wherein the adaptive reconstruction levels are used in place of the fixed set of reconstruction levels when repeating the assigning, and wherein the repeating occurs until a change in adaptive reconstruction level is less than a threshold amount.

19. The encoder claimed in claim 13, wherein the encoding application contains instructions for configuring the processor to calculate the adaptive reconstruction levels based upon minimizing the rate-distortion cost expression:

$$(c_{u,1} - u \cdot q_u)^2 + (c_{u,2} - u \cdot q_u)^2 + \ldots + (c_{u,m} - u \cdot q_u)^2 + \lambda \cdot r(q_u)$$

wherein c are the data points, u are the indices assigned, r( ) is a rate function based on an entropy encoding scheme for the adaptive reconstruction levels $q_u$, and m is an integer representing the number of data points assigned index u.

20. The encoder claimed in claim 13, wherein the data points comprise transform domain coefficients, and wherein the encoding application contains instructions for configuring the processor to obtain the transform domain coefficients by determining residual data in a prediction operation and to transform the residual data in a video encoding process.

21. The encoder claimed in claim 13, wherein the sequence of data points comprise one of audio data, image data, and video data.

22. The encoder claimed in claim 21, wherein the data points comprise video data, and the sequence of data points comprise one of a slice, a frame, and a group-of-pictures.

23. A decoder for decoding encoded compressed data, wherein the compressed data results from a lossy data compression process, the decoder comprising:
 a processor;
 a memory; and
 a decoding application stored in memory and containing instructions for configuring the processor to decode the encoded compressed data using by
  entropy decoding the encoded compressed data to obtain indices u and adaptive reconstruction levels $q_u$, wherein each index u obtained is a quantized data point from the lossy data compression process, and wherein each adaptive reconstruction level $q_u$ specifies a reconstruction level for_dequantizing one of the indices u and is based on the actual data points quantized to that index u, and
  reconstructing each_data point as the product of a respective index u obtained and the adaptive reconstruction level $q_u$ associated with that index, to produce a sequence of decoded data.

24. The decoder claimed in claim 23, wherein the compressed data comprises compressed video data, wherein the lossy data compression process comprises a video encoding process, and wherein the decoding application contains instructions for configuring the processor to inverse transform the reconstructed sequence of decoded data to produce residual data, and to perform a compensation operation on the residual data to produce reconstructed video data.

25. The decoder claimed in claim 23, wherein the encoded compressed data includes a set of the adaptive reconstruction levels $q_u$ for use in reconstructing the sequence of decoded data, and wherein the sequence of decoded data represents a reconstruction of an input data sequence.

26. The decoder claimed in claim 25, wherein the input data sequence comprises one of an audio sample, an image frame, an image slice, a video frame, a video slice, and a video group-of-pictures.

* * * * *